Nov. 29, 1966   C. W. MORRIS ETAL   3,287,898
SELF-REGULATING EXHAUST CONTROL SYSTEM
Filed Jan. 11, 1965   2 Sheets-Sheet 1
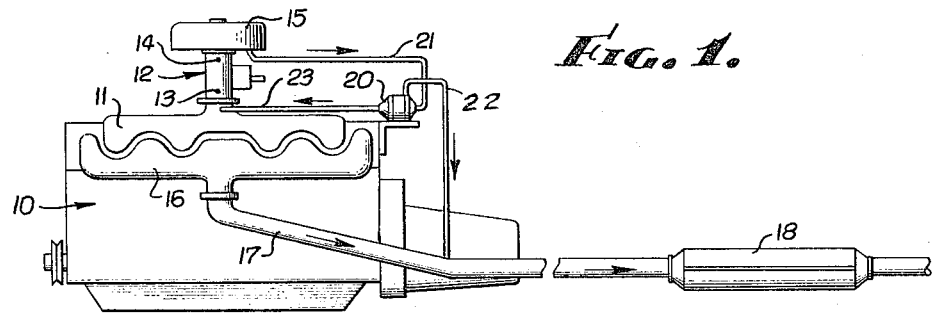
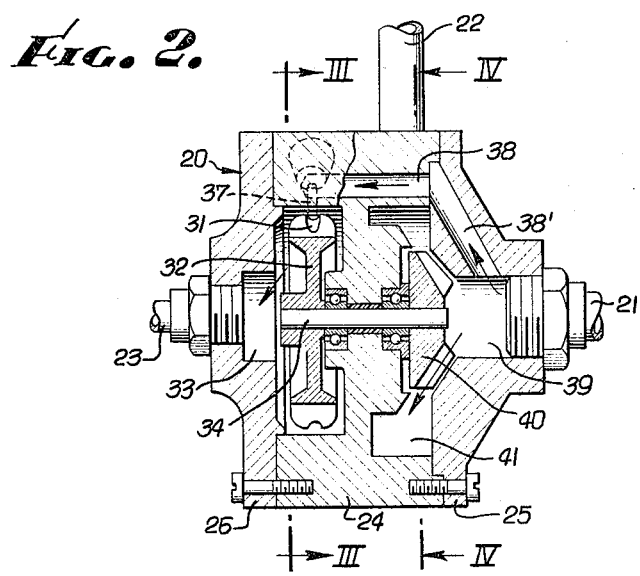
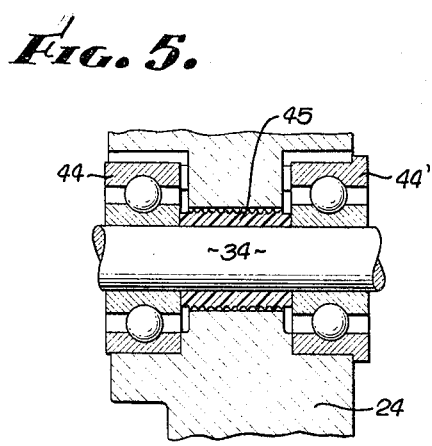
CHARLES W. MORRIS
LORNE L. FRAZIER
          INVENTORS.
By
Miketta, Glenny, Poms & Smith
           ATTORNEYS Nov. 29, 1966    C. W. MORRIS ETAL    3,287,898
SELF-REGULATING EXHAUST CONTROL SYSTEM
Filed Jan. 11, 1965    2 Sheets-Sheet 2
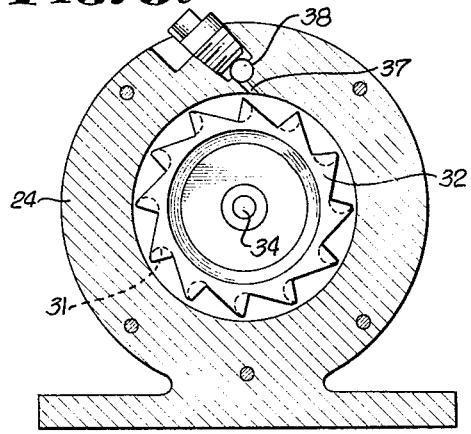
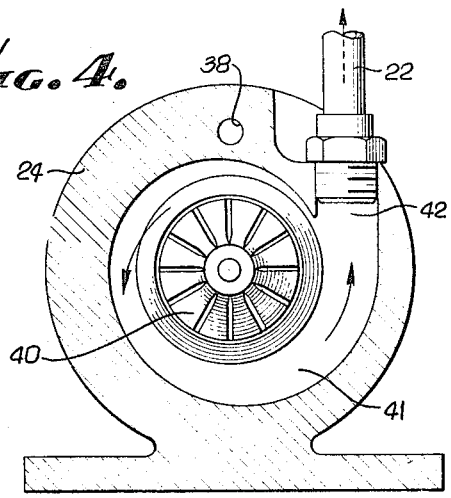
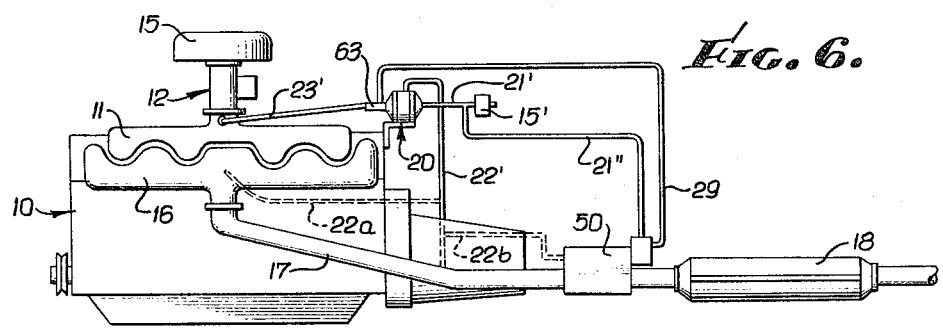
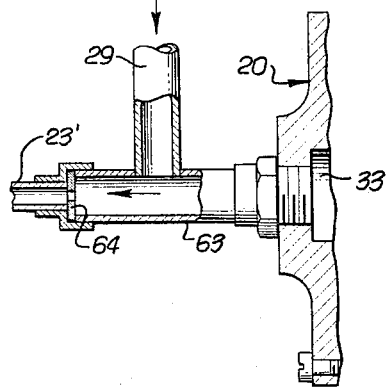
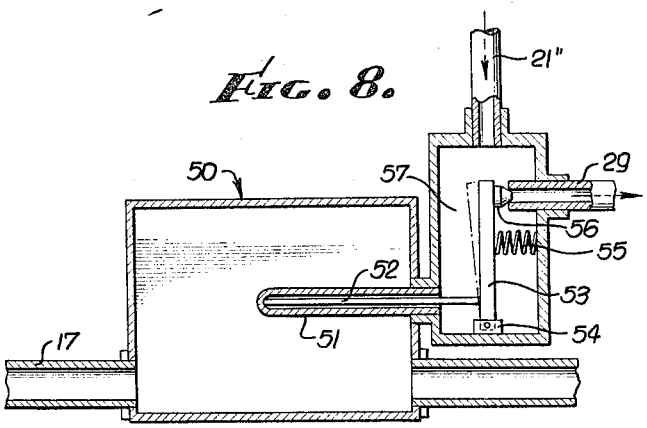
CHARLES W. MORRIS
LORNE L. FRAZIER
INVENTORS.
By
Miketta, Glenny, Poms & Smith
ATTORNEYS.

United States Patent Office 3,287,898
Patented Nov. 29, 1966

3,287,898
SELF-REGULATING EXHAUST CONTROL SYSTEM
Charles W. Morris, 11769 Chenault St., Los Angeles, Calif., and Lorne L. Frazier, 2514 W. 171st St., Torrance, Calif.
Filed Jan. 11, 1965, Ser. No. 424,546
7 Claims. (Cl. 60—30)

The present invention pertains to methods and means whereby the content of unburned hydrocarbons, fuel components and other pollutants contained in the exhaust gases of internal combustion engines may be eliminated or at least minimized. More specifically, the invention pertains to a method whereby a self-regulating system is provided, the various components of the system reacting in accordance with the operating condition of the engine without interference or impairment of engine performance or reduction in the main shaft power output of the engine and without the necessity of installing and maintaining complicated and troublesome secondary control devices.

Although it has been recognized heretofore that exhaust gases of internal combustion engines contain hydrocarbons and combustible fuel components which are major contributors to air pollution, and systems and devices designed to ameliorate discharge of such pollutants have been disclosed heretofore, the prior attempts have not been entirely satisfactory. Among other reasons why prior attempts have not been successful are (1) failure to recognize the differences in character of exhaust gas composition at different operating conditions of an engine; (2) the size and complexity of the devices and units; and (3) impairment of performance characteristics of an engine equipped with complex units.

Although the means and methods of this invention are applicable to any internal combustion engine (whether stationary or on a vehicle) they are of greatest utility when applied to engines operated under varying conditions of load and speed. As used herein, acceleration shall refer to a stage or condition where the r.p.m. of an engine is increasing and deceleration shall refer to a stage or operation where the engine speed is decreasing; idling is a stage wherein the engine is at a low speed (generally 200 to 500 r.p.m.); cruising as used herein may be a stage where the engine is at a substantially constant working speed of say 2,000; 3,000 or 4,000 r.p.m. The term "exhaust system" of an internal combustion engine, as used herein, refers to all portions of the engine downstream from its exhaust valves and may include the exhaust ports in the head or engine body, the exhaust manifold, exhaust pipe, muffler and whatever type of catalytic, electrostatic or secondary combustion (afterburner) type of device is used in treating the exhaust gases emitted by the exhaust ports and manifold.

It has been recognized heretofore that it is desirable to add air to the exhaust gases of an internal combustion engine, in order to facilitate a secondary combustion or promote the elimination of harmful irritating pollutants carried by the exhaust gases. Some prior workers (as in Patent 2,667,031) have provided air supply blowers which were belt driven from the main shaft of the engine. Such arrangements not only reduce the performance characteristics of the engine but fail to either supply the proper amount of additional air under certain operating conditions or provide excessive amounts of air under other conditions, since the amount of air being supplied is somewhat proportional to engine r.p.m. That such prior attempts are not sound or workable will become apparent from the following data.

For purposes of explanation and simplification, the four important stages of operating conditions of a typical internal combustion engine may be represented by the following values:

| Condition | R.p.m. | Throttle Position | Combustibles In Exhaust | Exhaust Flow c.f.m. | Intake Manifold (In. Hg Vac.) |
|---|---|---|---|---|---|
| Idling | 300-550 | Closed | Maximum | 6 to 8 | 17-19 |
| Cruising | 1,000-3,500 | Partly open. | Minimum | 15 to 70 | 12-17 |
| Accelerating | 1,000-4,000 | Open | Minimal | 40 to 200 | 0-3 or 4 |
| Decelerating | 4,000-550 | Closed | Maximum | 6 to 8 | 24-19 |

The above values may vary with size, design and performance characteristics of an internal combustion engine, but exhaust combustibles and pollutants are always at maximum values during idling and deceleration. It has been found that additional air, in an amount approximating 40% (35% to 45%) of the volume of exhaust gases being discharged, should be provided during these two stages of operation in order to burn or facilitate elimination of the residual combustibles. In terms of the above tabulation, between 2.5 and 3.2 c.f.m. of air need be added to the exhaust gases during idling and deceleration, for an average size of engine.

It is evident that a blower driven by the shaft and at speeds correlated to engine speed would not answer the requirements during acceleration, deceleration and idling. In accordance with the method and means of the present invention when a vehicle is accelerating and engine r.p.m. is increasing from say 2,000 to 3,000 r.p.m. the method and and means here disclosed will supply a minimal amount of air; when the vehicle is decelerating and engine speed is decreasing through the same range (3,000 to 2,000 r.p.m.) a maximum amount of air will be supplied.

The present invention provides a self-regulating method whereby additional air is supplied to the exhaust system in accordance with then existing operating condition of the internal combustion engine. Generally stated, the method utilizes latent, waste power (which is not normally utilized) in generating torque which then drives a very compact blower which supplies the necessary air to the exhaust system virtually only during idling and deceleration.

The means of this invention hereafter disclosed in greater detail are particularly adapted for mass production, are compact and simple to install and (after minor adjustment) the same units are capable of being used on internal combustion engines of widely varying size and design. The means of the present invention are compact and free from secondary controls, valves, by-pass arrangements, etc. which may be sources of breakdown and malfunctioning when the engine is operated under road conditions for a protracted period of time.

An object of the present invention therefore is to provide a method and a system for facilitating the removal of residual combustibles and pollutants from the exhaust gases of an internal combustion engine.

A further object is to attain the above by utilizing heretofore unused latent forces (normally produced by an operating engine) in supplying additional air to the exhaust system of an engine in a self-regulating manner.

Another object is to provide compact, foolproof means whereby predetermined amounts of air are automatically and preferentially supplied to the exhaust system of an internal combustion engine during idling and deceleration, whereas minimal amounts of air are supplied during acceleration, and cruising.

In the drawings:

FIG. 1 is a simplified side elevation of an internal combustion engine provided with one form of the invention;

FIG. 2 is a vertical, axial section through an exemplary torque generating motor and blower combination which may be employed in the system shown in FIG. 1;

FIGS. 3 and 4 are transverse sections taken along planes III—III and IV—IV of FIG. 2, showing turbine and blower arrangements, respectively;

FIG. 5 is an enlarged axial section illustrating a preferred form of bearing assembly for use in the device of FIG. 2;

FIG. 6 diagrammatically illustrates a modified system and various zones of the exhaust system to which additional air may be supplied in a self-regulating manner;

FIG. 7 is a section thru a simple orifice-type restrictor embodied in the system of FIG. 6;

FIG. 8 is a section through one form of auxiliary temperature responsive arrangement which may be used with some forms of exhaust gas treating devices employed in the systems of FIGS. 2 and 6.

As shown in FIG. 1, the system herein disclosed employs an internal combustion engine generally indicated at 10, such engine having an intake manifold 11 supplied with a suitable fuel-air mixture by any one of the many forms of carburetors and similar devices, a typical carburetor being indicated at 12. In most instances, such carburetors are provided with fuel, include a throttle valve (indicated at 13), a choke indicated at 14 and some form of filter 15 for removing solid impurities from incoming air.

The exhaust systems of such an engine may include the exhaust valve chambers in the head of the engine, an exhaust manifold 16, exhaust pipe 17 leading to any suitable type of muffler or device 18 for treating gases to facilitate the combustion, removal or elimination of hydrocarbons and pollutants which may be discharged from the exhaust, or to a combination of such device with a muffler.

In accordance with the present invention, there is provided a combined motor-blower unit 20 which may be mounted on a bracket or in any suitable location adjacent the engine. The blower section of this unit draws in ambient air through a supply line 21 and discharges the major portion of such air at a slightly higher absolute pressure into any desired portion of the exhaust system, as for example, into the exhaust pipe 17 as indicated in FIG. 1. The motor section of unit 20 is connected as by line 23 to a zone or reduced sub-atmospheric pressure in the intake manifold or any portion of the engine between the throttle 13 and the intake valve ports of the engine 10, and utilizes this normally produced but heretofore unused low pressure in generating torque.

The preferred form of torque generating unit or combined motor-blower 20 is illustrated in FIGS. 2, 3 and 4. As there shown, the unit may comprise a body 24 and end plates 25 and 26. The torque generating unit shown in the drawing embodies an enclosed, impulse-type turbine having a series of buckets 31 on its runner 32 mounted upon the shaft 34, said turbine runner being adapted to rotate within a chamber 33 having a port in communication with conduit 23.

An appropriate small nozzle 37 tangential to the pitch radius of the runner 32 is provided, such nozzle being supplied with air through a passageway 38 in the body 24 and a confluent passageway 38' in the end plate 25. The passageway 38' leads to an axial chamber 39 which is in communication with air at substantially atmospheric pressure through conduit 21.

The chamber 39 also acts as a supply chamber for the blower 41, the blower having a plurality of radially extending vanes discharging into an annular chamber of progressively increasing cross-section and terminating in a tangential discharge port 42 in communication with discharge conduit 22 (see FIG. 4). It is to be noted that only a small proportion of the air supplied to chamber 39 by line 21 is diverted through passageway 38–38' to the nozzle 37; the cross-sectional areas are so proportioned so as to permit most of the air to be acted upon by the blower 40.

It is to be noted that air at substantially atmospheric pressure is supplied to the nozzle 37 whereas the discharge or tail race of the turbine is in communication by conduit 23 with a zone of sub-atmospheric pressure such as the zone existing in the intake manifold 11 wherein absolute pressures on the order of 13–6 Hg exist during idling and deceleration conditions of the engine. As a result, air at high velocity is discharged through the nozzle, acts upon the runner and its buckets and generates torque in shaft 34. This torque is transmitted to the blower 40 mounted on the opposite end of the shaft. The greatest proportion of the air supplied to chamber 38 is therefore discharged by the blower vanes into the spiral discharge passageway 41 and through pipe 22 to any suitable portion of the exhaust system of the engine. Design parameters should provide a blower which will deliver air in quantities ranging from about 35%–45% by volume of the normal exhaust gas flow of the engine during idling and deceleration; the pressure of the air so discharged may be slightly above 30" Hg, a pressure of 34" or 35" Hg absolute being adequate.

It may be noted that the entire unit 20 may be extremely small, may be made of die cast parts and a standard unit of a given size may be readily adapted for effective use on internal combustion engines, differing greatly in piston displacement and number of operating cylinders, by partially blocking passageway 38 or 38' and, if desired, introducing a restriction or orifice plate between turbine chamber 33 and line 23.

The shaft 34 often revolves at high speed and it is desirable to mount the same in suitable ball bearings 44 and 44' and to employ a labyrinth-type seal 45 around the shaft 34 and between the ball bearing races. A sleeve-type labyrinth seal made of a synthetic resinous material such as "Teflon" (tetrafluorocarbon composition) or the like and having a plurality of minute flanges or ribs on its surface is eminently suitable for use as a self-sealing bearing.

As previously stated, the air discharged by the blower by line 22 may be conducted to any desired portion of the exhaust system of the engine to efficiently facilitate the combustion, elimination, removal, conversion or amelioration of combustibles and pollutants normally present in exhaust gases of the engine.

Attention is called to the fact that the system described is self-regulating in that as intake manifold pressure approaches atmospheric (during acceleration and cruising conditions) very little torque is generated and the blower effect is unappreciable so that air is pumped into conduit 22 at a minimal rate. However, air in adequate amounts is pumped to the conduit during idling and deceleration because during such operating conditions, relatively low absolute presures exist in the intake manifold and in conduit 23 and during such operating conditions, maximum amounts of combustibles exist in the exhaust and require maximum amounts of added air to facilitate their combustion and removal. It will be appreciated that in the event an engine were equipped with a system to continually furnish added air to an exhaust treating device at a rate more or less proportional to r.p.m. of the engine, a catalytic or afterburner-type of exhaust treating device may have its temperature greatly reduced during cruising so that the device becomes ineffective during deceleration, just when it is expected to perform at peak efficiency. Such malfunctioning cannot taek place with the system of the present invention.

FIG. 6 illustrates certain modifications which can be utilized either singly or in combination. It will be noted that the air intake line 21' leading to the power conversion unit and blower 20 receives its air from the ambient atmosphere and is not connected to the normal air filter 15. However, it is desirable to use clean air in the system and therefore the suction line 21' may be provided with a small air filter 15'. Moreover, the air discharged by the blower through line 22' may be sent directly to the intake manifold as indicated by dash lines 22a, may be sent directly into the exhaust chambers of the head, immediately adjacent the intake valves therein or may be directed as by line 22b directly into an exhaust treating device such as the afterburner type indicated at 50.

Devices such as a combustor 50, as well as catalytic-type gas treating devices, operate most effectively at predetermined, relatively high temperatures on the order of 1500–1700° F. In order to prevent excessively high temperatures in such devices, it may be desirable to reduce the amount of air being supplied thereto. As shown in FIG. 8, the combustor 50 may be provided at a suitable point with a temperature responsive device which, in the form illustrated, comprises an outer sheath 51 of temperature resisting alloy containing a quartz rod 52 having a lower coefficient of expansion than the sheath 51. The free end of the quartz rod may bear against a valve arm 53 pivoted at 54, the arm being normally biased against the rod 52 as by spring 55. The end of arm 53 carries a valve 56 which is normally seated upon the end of conduit 29. The enclosed chamber 57 in which the valve operates is supplied by line 21" with air at substantially atmospheric pressure and temperature. It will be evident that in the event the temperature within the combustor or treating unit 50 exceeds a predetermined degree, valve arm 53 will open the valve 56 and permit atmospheric air to pass through the chamber 57 into line 29, the end of such line being connected to line 23' adjacent the turbine unit 20. This will increase the presure adjacent the chamber 33 in which the turbine operates, thereby decreasing the pressure differential between such chamber and the air being jetted into the chamber from conduit 38 and in this way reduce turbine speed and power. Such reduction in torque and speed reduces the amount of air being pumped by blower 40 to the exhaust system and this in turn tends to reduce the amount of oxidation taking place in the device 50 and lowers its temperature. Moreover, the additional air being furnished to the intake manifold through the line 29 now tends to lean the fuel-air mixture and tends to reduce the amount of residual combustibles in the exhaust gases.

It is desirable however to place a limit upon the amount of additional air fed into the intake manifold as by line 23'. For this reason it is desirable to place an orifice plate or restrictor in line 23'. A suitable arrangement to accomplish this purpose is indicated in FIG. 7 wherein it will be noted that the runner chamber 33 of the turbine is in communication with a fitting 63, the end of the fitting being removably connected to line 23' so as to permit ready insertion of an orifice plate 64 into the stream flowing from chamber 33 and line 29 into line 23'. By the use of similar restrictors in line 23, (FIG. 1), standardized units 20 can be adapted for effective use on engines of smaller or larger piston displacement.

We claim:

1. A self-regulating system for facilitating the reduction of pollutants and combustibles in exhaust gases of an internal combustion engine, such engine having an intake zone at variable subatmospheric pressure during operation and an exhaust system, comprising: a turbine adapted to generate torque, said turbine including a substantially enclosed runner mounted upon a rotatable shaft, nozzle means for directing gas from a source at virtually atmospheric pressure for reaction against said runner, and a spent gas outlet port; pipe means communicating said spent gas port with an intake zone of an internal combustion engine; a blower driven by said shaft; means for supplying air at virtually atmospheric pressure to said blower; a discharge port from said blower; and pipe means for conducting air from said discharge port to the exhaust system of said engine, whereby the speed of said turbine and blower and the volume of air discharged by the blower are varied generally inversely to the absolute pressure of the engine intake zone.

2. A system as stated in claim 1 wherein the blower is arranged to discharge air at a volumetric rate of between about 35% and about 45% of the volumetric rate at which exhaust gases are discharged by the engine during idling and deceleration thereof.

3. A system as stated in claim 1 wherein the exhaust system of the engine includes a device for oxidizing and rendering innocuous combustibles and pollutants carried by exhaust gases emitted by the engine, and the pipe means from the discharge port of the blower conduct air to such device.

4. A system as stated in claim 1 wherein the exhaust system of the engine includes a device for oxidizing and rendering innocuous combustibles and pollutants carried by exhaust gases emitted by the engine, the blower is arranged to discharge air at a volumetric rate of between about 35% and about 45% of the volumetric rate at which exhaust gases are discharged by the engine during idling and deceleration thereof, and the pipe means from the discharge port of the blower conducts air to such device.

5. A system as stated in claim 3 including means responsive to selected high temperatures in said device for admitting air at virtually atmospheric pressure into the pipe means communicating with the spent air port of said turbine, whereby the speed of the turbine and blower is reduced.

6. A self-regulating method of supplying air to the exhaust system of an internal combustion engine during idling and deceleration thereof, by utilizing normally non-utilized power potential produced during operation of an internal combustion engine, the engine having a primary air supply zone, a modulated intake zone at a lower absolute pressure than said primary air supply zone and an exhaust system, comprising: generating torque in a motor unit by conducting a portion only of air from the primary air supply zone to an intake zone of a motor unit and communicating a discharge zone of such unit with the modulated intake one of the engine, the intake and discharge zones of the motor unit being in torque generating relation; driving a blower with torque thus generated by the motor unit, conducting a further and larger portion of air from the primary air supply zone to said blower and conducting air discharged by said blower into a desired portion of the exhaust system of the engine.

7. A self-regulating method of supplying air to the exhaust system of an internal combustion engine during idling and deceleration thereof, by utilizing normally non-utilized power produced during operation of an internal combustion engine, the engine having a modulated intake zone at a subatmospheric pressure which varies with operating conditions of the engine, and an exhaust system, comprising: generating torque in a motor unit by conducting air at virtually atmospheric pressure to an intake zone of a motor unit and communicating a discharge zone of such unit with the modulated intake zone of the engine, the intake and discharge zones of the motor unit being in torque generating relation; driving a blower with torque thus generated by the motor unit, conducting a further and larger portion of air at virtually atmopheric pressure to said blower and conducting air discharged by said blower into a desired portion of the exhaust system of the engine.

References Cited by the Examiner

UNITED STATES PATENTS 3,116,596   1/1964   Boehme et al. _____ 60—30

FOREIGN PATENTS 483,217   7/1953   Italy.

MARK NEWMAN, *Primary Examiner.*

RALPH D. BLAKESLEE, *Examiner.*